United States Patent Office
3,799,900
Patented Mar. 26, 1974

3,799,900
PROCESS FOR THE PREPARATION OF MODIFIED GLYCIDYL ISOCYANURATE RESINS
Erwin Weinrich, Dusseldorf-Holthausen, Germany, assignor to Henkel & Cie G.m.b.H., Holthausen, Germany
No Drawing. Filed Nov. 16, 1967, Ser. No. 683,443
Claims priority, application Germany, Nov. 30, 1966, H 61,143
Int. Cl. C08g 45/00
U.S. Cl. 260—18 EP
10 Claims

ABSTRACT OF THE DISCLOSURE

This invention relates to a process of preparation of soft, hardenable epoxide resins based on triglycidyl isocyanurate which, when hardened, retain the desired high temperature stability with a greater flexibility than hardened triglycidyl isocyanurate resins, as well as the soft, hardenable epoxide resins produced. This process is characterized by reacting a crystalline triglycidyl isocyanurate having an epoxide oxygen content of at least 14% with an organic acid derivative free of the epoxide reacting substituents selected from the group consisting of organic monocarboxylic acids, organic dicarboxylic acids, and organic monocarboxylic acid anhydrides, said organic acid derivative being present in a ratio to provide from 1 to 10 carboxyl groups for each 30 epoxide groups in the mixture and recovering a soft, hardenable epoxide resin.

THE PRIOR ART

It is well known to process crystalline triglycidyl isocyanurate by reaction with known hardeners for epoxide resins, for example, with organic polycarboxylic acid anhydrides or aromatic amines, to obtain molded bodies, which are distinguished by good mechanical properties and by outstanding electrical and thermal properties. However, due to the relatively high melting point and the related high processing temperatures, processing pure crystalline triglycidyl isocyanurate involves various difficulties. Furthermore, the crystalline triglycidyl isocyanurate can be dissolved only with difficulty in most of the commonly used solvents, so that a processing from solutions, for example, for impregnation, becomes technically very expensive.

OBJECTS OF THE INVENTION

An object of the present invention is to modify crystalline triglycidyl isocyanurate in such a manner, that the resultant modified compound will melt at low temperatures and is easily soluble in solvents, while retaining, in hardened form, the other good characteristics.

Another object of this invention is the development of a process for the preparation of a soft, hardenable epoxide resin based on triglycidyl isocyanurate which comprises the steps of reacting a crystalline triglycidyl isocyanurate having an epoxide oxygen content of at least 14% with an organic acid derivative free of epoxides and other epoxide reacting substituents selected from the group consisting of organic monocarboxylic acids, organic dicarboxylic acids and organic monocarboxylic acid anhydrides, said organic acid derivative being present in a ratio to provide from 1 to 10 carboxyl groups for each 30 epoxide groups in the mixture, at a temperature above the melting point of the ingredients for a time sufficient for the reaction product to attain a constant epoxide oxygen content, and recovering said soft, hardenable epoxide resin.

A further object of this invention is the obtention of a soft, hardenable epoxide resin based on triglycidyl isocyanurate.

A yet further object of the present invention is the obtention of a hardened epoxide resin having improved physical properties without a substantial reduction of thermal properties by the reaction of the above soft, hardenable epoxide resin based on triglycidyl isocyanurate, with an epoxide resin hardener.

These and other objects of the invention will become more apparent as the description thereof proceeds.

DESCRIPTION OF THE INVENTION

According to the invention, these objects are achieved in that crystalline triglycidyl isocyanurate having an epoxide oxygen content of at least 14% is reacted with monocarboxylic acids or their anhydrides or dicarboxylic acids, allotting about 1 to 10, preferably 3 to 8 carboxyl groups to every 30 epoxide groups present in the triglycidyl isocyanurate.

The crystalline triglycidyl isocyanurate to be used according to the process of the invention should have an epoxide oxygen content of at least 14%. The preparation of such crystalline triglycidyl isocyanurate is known as such and described in U.S. Pat. No. 3,337,509, dated Aug. 22, 1967. This preparation can be effected by purifying the crude reaction products which are obtained, for example, by reacting cyanuric acid with an excess of epichlorohydrin. Crystalline triglycidyl isocyanurate with the required epoxide oxygen content can be obtained by one or repeated recrystallizations from suitable solvents such as, for example, methanol.

For the process of the invention, aliphatic, cycloaliphatic, aromatic or heterocyclic monocarboxylic acids or their anhydrides or the corresponding dicarboxylic acids can be utilized, which are free of epoxides and other epoxy reacting substituents than the carboxyl group. Suitable, for example, are aliphatic mono- or dicarboxylic acids such as alkanoic acids, alkenoic acids, alkanedioic acids and alkenedioic acids having from 2 to about 40 carbon atoms, their saturated or unsaturated carbon chains can be straight or branched, for example, acetic acid, propionic acid, butyric acid, 2-ethylhexylcarboxylic acid, decanoic acid, lauric acid, palmitic acid, stearic acid, behenic acid, acrylic acid, methacrylic acid, undecylenic acid, oleic acid, succinic acid, adipic acid, dimethyladipic acid, sebacic acid, dimerized fatty acids, maleic acid, fumaric acid and others. Moreover, the mentioned acids may contain under the reaction condition stable substituents other than epoxides which do not react with epoxy oxygen, such as halide atoms or alkoxy groups. Examples for these acids are chloroacetic acid, bromoacetic acid, once or repeatedly chlorinated stearic acid, chlorinated or brominated glutaric, adipic or sebacic acid, chlorinated dimeric fatty acid as well as β-alkoxypropionic acids.

Also suitable for the process of the invention are cycloalkane carboxylic acids such as cyclohexane carboxylic acid, phenyl carboxylic acids such as benzoic acid, phenyl dicarboxylic acids such as o-phthalic acid, isophthalic acid, terephthalic acid, cycloalkene and cycloalkane dicarboxylic acids such as tetrahydrophthalic acid, hexahydrophthalic acid, heterocyclic carboxylic acids such as the isomeric nicotinic acids, the isomeric quinolinic acids, quinoline dicarboxylic acid, and the like. The acids mentioned may also contain other substituents which do not react with epoxy oxygen, such as the halides, for example, chlorine or bromine atoms, and alkoxy or phenoxy groups. Instead of the monocarboxylic acids, their acid anhydrides are usable for this purpose. It goes without saying, that the mentioned acids can be used singly or as a mixture thereof.

The reaction of crystalline triglycidyl isocyanurate having an epoxide oxygen content of at least 14% with the carboxylic acids requires a duration of about ½ to 6 hours, preferably 1 to 5 hours, depending on the reactivity of the carboxylic acid used, in order to reach the endpoint of a constant epoxide value of the reaction mixture product. The reaction temperature ranges, as a rule, above the melting point of the reactants and preferably between 110° C. and 150° C.

Generally, the reaction of the invention is conducted so that the carboxylic acid utilized is introduced into the melted triglycidyl isocyanurate in small fractions. It is also possible, to realize the reaction in the presence of organic solvents, in which case the carboxylic acid is introduced into the mixture of triglycidyl isocyanurate and solvent advantageously under stirring and heating. This process can, for example, be advantageous, when the modified triglycidyl isocyanurate is intended to be further processed from a solution.

The completion of the reaction can be noted from the fact that the epoxide oxygen content of the reaction product mixture remains constant.

The modified glycidyl isocyanurate is soft at room temperature and can be stored in this condition for longer than a year. Should, by way of an exception, any phenomena of crystallization occur, these can be eliminated by heating the modified glycidyl isocyanurate for a short period of time. At temperatures of 50° to 70° C., easily pourable mixtures can be prepared from the modified glycidyl isocyanurate together with the commonly used epoxide resin hardeners.

The modified glycidyl isocyanurate, obtainable according to the invention, has an epoxide equivalent of between 116 and 200, corresponding with an epoxide oxygen content of about 13.8 to 8.0%, depending on the type and amount of carboxylic acid employed.

Compared with the unmodified crystalline triglycidyl isocyanurate, the modified glycidyl isocyanurate of the invention is easily soluble in organic solvents, such as acetone, butanone, cyclohexanone, methylcyclohexanone, dioxane, tetrahydrofuran, benzyl alcohol, toluene, xylene, ethyl acetate, butyl acetate, amyl acetate, dimethylsulfoxide, chloroform and methylene chloride. In general, solutions with a content of about 25% to 60% of the modified glycidyl isocyanurate can be prepared at room temperature.

The further processing of the soft, hardenable modified glycidyl isocyanurate epoxy resins of the invention can be effected with the usual polyadduct formers or catalysts, known for the hardening of epoxide compounds or triglycidyl isocyanurate. (The term "catalysts" means usually those compounds, in comparison with the "polyadduct formers," which are added to the epoxide compound to be hardened only in relatively small amounts. This differentiation, however, is not always strictly observed.)

The hardening of the reaction mixture is effected in the usual manner at temperatures of from 60° C. to 200° C., particularly at from 80° C. to 180° C. over a period of from about 1 to 20 hours, particularly from 2 to 8 hours. In most cases the reaction is complete after this period of time. However, to obtain optimal values of the hardened resin, it is advisable to temper the molded bodies for an additional time at elevated temperatures of from 120° C. to 210° C.

As polyadduct formers or epoxide resin hardeners, for example, the anhydrides of organic polycarboxylic acids can be employed. For this purpose, for example, the anhydrides of hydrocarbon di- and polycarboxylic acids are employed such as hexahydrophthalic acid anhydride, tetrahydrophthalic acid anhydride, phthalic acid anhydride, naphthylene-dicarboxylic acid anhydride, methylcyclohexane-dicarboxylic acid anhydride, dodecenylsuccinic acid anhydride, pyromellitic acid anhydride, endomethylenetetrahydrophthalic acid anhydride, methylendomethylenetetrahydrophthalic acid anhydride, dichloromaleic acid anhydride, hexachloroendomethylenetetrahydrophthalic acid anhydride, dibromo- and tetrabromophthalic acid anhydride and the like.

The amount of the organic polycarboxylic acid anhydride epoxide resin hardener to be used should be allotted so, that from 0.6 to 1.2, preferably 0.8 to 0.9 carboxylic acid anhydride groups are present for each epoxide group in the molecule of the modified glycidyl isocyanurate.

Also considered as polyadduct formers are basic epoxide resin hardeners such as organic nitrogen compounds, which contain at least two active hydrogen atoms bonded to nitrogen atoms in the molecule. As examples of such compounds are primary or secondary amines, which may be of aliphatic or cycloaliphatic structure. The cyclic amines may contain cycloaliphatic, aromatic and heterocyclic rings. Moreover, those amines can be utilized which contain several of the rings mentioned. The amino nitrogen in heterocyclic amines can be a constituent of the ring. In the compounds indicated, the active hydrogen atoms can be attached to one or several nitrogen atoms. The following are examples of the primary and secondary amines, alkylamines, such as ethylamine, propylamine, butylamine, hexylamine, dodecylamine; phenylalkylamines, such as benzylamine; alkanediamines such as ethylenediamine, propylenediamine, butylenediamine, dimethylaminopropylamine, diethylaminopropylamine; alkanepolyamines such as diethylenetriamine, triethylenetetramine; cycloalkylenediamines such as 1,2- or 1,4-diaminocyclohexane, 1,2-diamino-4-ethylcyclohexane, 1-cyclohexyl-3,4-diaminocyclohexane; aniline; o,m or p-phenylenediamine; benzidine; 4,4'-diaminophenylmethane; also condensates of aniline with formaldehyde can be utilized.

Moreover, such amines can be used for the epoxide resin hardening reaction of the invention, which contain additional functional groups, for example, alkanolamines such as ethanolamine, propanolamine, N-(hydroxyethyl)-1,2-diaminopropane, N-(hydroxypropyl)-m-phenylenediamine; 4,4'-diaminodiphenylsulfide; 4,4'-diaminodiphenylsulfone; dicyanodiamide; dicyanoethylethylenediamine; 1,4-bis-(γ-aminopropoxymethyl) - cyclohexane; chlorinated benzidine; 4,4' - diamino-3,3' - dichlorodiphenylmethane; 4,4'-diamino-3,3'-dimethoxydiphenylmethane; 4,4'-diaminodiphenyloxide, etc.

Favorable results in the hardening reaction have also been obtained with acid amides containing free amino groups, which are prepared by reacting polyamines, such as ethylene diamine, diethylenetriamine and triethylenetetramine with polymerized fatty acids.

As a rule, the amount of the epoxide resin amine hardener to be used should be measured so that from 0.6 to 1.2, preferably 0.8 to 1.0 reactive amino hydrogens are allotted to each epoxide group in the molecule of the modified glycidyl isocyanurate.

A compilation of compounds suitable as polyadduct formers or epoxide resin hardeners can be found in the book by A. M. Paquin, "Epoxidverbindungen und Epoxidharze" published in 1960, by Springer Verlag, in the chapter concerning "Härtung in der Praxis." Of course, this reference is not to be construed that only these hardeners as mentioned in the book could be used exclusively.

Fundamentally, all of the Lewis-acids are suitable as catalysts, alone or in the form of their complexes, for the hardening of the modified glycidyl isocyanurate of the invention. As Lewis-acids, first of all, borontrifluroide can be considered, as well as its complexes with monoethanolamine, piperidine, trimethylamine, hexamethylenetetramine, urea, pyridine, or also water, ethyleneglycol, glycerine, benzyl alcohol, triethylamine, dimethylbenzylamine, dilaurylamine, vinylpyrrolidone, caprolactam and others, also tin tetrachloride, titanium tetrachloride, antimony pentachloride and others can be used as Lewis-acids.

An additional important group of suitable catalysts for the hardening of the modified glycidyl isocyanurates of the invention are the phosphines and tertiary amines, as, for example, triphenylphosphine, tetraphenylphosphonium chloride, diisopropylamine, N,N-dimethylaniline, 2,4,6-tris - (dimethylaminomethyl)-phenol, triethanolamine borate, tetramethylammonium chloride, benzyltrimethylammonium hydroxide and chloride, N-alkylpyridinium salts, etc.

Also catalytically effective are alcoholates, such as aluminum triisopropylate, aluminum tributyllate, aluminum, cobalt, copper or nickel compounds of ethyl acetoacetate or of acetylacetone. Also suitable is butyl titanate.

As it is well known, for further processing, dyes, fillers or fibrous material may be added to the modified glycidly isocyanurate of the invention, as for example, quartz powder, glass powder, asbestos fibers, mica, aluminum oxide, titanium oxide, zirconium oxide, ground dolomite and barium sulfate.

If the modified glycidyl isocyanurate according to the invention is to be processed into cast resins, in particular organic dicarboxylic acid anhydrides can be used as the epoxide resin hardeners. In contrast to the unmodified powdery triglycidyl isocyanurate, the thus obtained casting materials can be processed at a temperature of 60° C. At this temperature they retain a low viscosity for a prolonged time. It is of particular advantage that the molded bodies prepared in this manner exhibit improved mechanical properties at constant electrical values and with a hardy noticeable drop in their Martens temperatures, as compared with a similar casting material based on triglycidyl isocyanurate.

Furthermore, the modified glycidyl isocyanurate according to the invention can be utilized, together with suitable polyadduct formers or hardening catalysts, for the preparation of laminated materials, molding substances, adhesive bonds, coatings or possibly together with organic solvents, as putty or fillers. Generally, all of those fields of application of the modified glycidyl isocyanurates are considered, for which epoxide resins have already been used.

The following specific embodiments are illustrative of the practice of the invention. They are not, however, to be deemed limitative in any manner.

EXAMPLES 1–8

150 gm. of crystalline triglycidyl isocyanurate (mixture of the high and low melting forms; epoxide oxygen content, 15.5%) were heated to about 125° C. in a 500 cc. three-neck flask equipped with stirrer and thermometer. Next, within the space of one hour, various amounts of the carboxylic acids mentioned in Table I were introduced in the mixture. After the addition had been finished, the reaction was completed at elevated temperature under constant stirring as specified in Table I, until a constant epoxide value had been attained.

In Table I, the consecutive numbers of the examples are given in the first column. The following columns indicate the added acid in gm./150 gm. of triglycidyl isocyanurate (TGI), the ratio between the triglycidyl isocyanurate and the carboxyl groups employed, the reaction conditions for the completion of the reaction, the epoxide value of the resultant product, the epoxide equivalent, and the solubility in acetone at 20° C.

Hardening of the modified glycidyl isocyanurate resins

For the production of molded bodies from the modified glycidyl isocyanurate resins, mixtures with hexahydrophthalic acid anhydride were prepared, employing about 0.9 acid anhydride groups for each epoxide group in the molecule. At temperatures between 80° and 100° C., molded resin bodies measuring 10 x 15 x 120 mm. were cast from these mixtures and gelatinized at a temperature of 90° C. Thereafter, these molded bodies were hardened for 3 hours at 160° C. and then tempered for 20 hours at 200° C.

The following Table II indicates in the first column the number of the example, according to which the modified glycidyl isocyanurate resin was prepared. The next column indicates the amount of the hexahydrophthalic acid anhydride (HHPA) utilized, based on 100 gm. of the modified glycidyl isocyanurate resin. The following columns indicates the resistance to deformation by heat (DIN 53 458), impact strength (DIN 53 453), deflection and flexural strength (DIN 53 452). The surface leakage of current amounted in each case to KA 3 c (DIN 53 480).

TABLE II

| Resin according to example | HHPA, gm. per 100 gm. of resin | Martens temp., °C. | Impact strength, kp. cm./cm.² | Deflection, mm. | Flexural strength, kp./cm.² |
|---|---|---|---|---|---|
| 1 | 93.5 | 179 | 25 | 9 | 1,270 |
| 2 | 76.1 | 158 | 27 | 9 | 1,310 |
| 3 | 77.8 | 114 | 24 | 8 | 1,110 |
| 4 | 105.3 | 118 | 22 | 8 | 1,250 |
| 5 | 86.5 | 216 | 16 | 8 | 1,170 |
| 6 | 103.8 | 218 | 14 | 5 | 1,090 |
| 7 | 85.9 | 173 | 18 | 8 | 1,160 |
| 8 | 76.0 | 162 | 26 | 10 | 1,290 |

The preceding specific embodiments are illustrative of the process of the invention. It is to be understood, however, that other expedients known to those skilled in the art may be employed without departing from the spirit of the invention or the scope of the appended claims.

I claim:

1. A soft epoxide resin based on triglycidyl isocyanurate produced by the process which consists essentially of the steps of reacting a crystalline triglycidyl isocyanurate having an epoxide oxygen content of at least 14% with an organic derivative free of epoxides and other epoxide reacting substituents selected from the group consisting of alkanoic acids, alkenoic acids, alkanedioic acids and alkenedioic acids, all having from 2 to about 40 carbon atoms, and the acid anhydrides of said alkanoic acids and alkenoic acids, said organic derivatives being present in a ratio to provide from 1 to 10 carboxyl groups for each 30 epoxide groups in the mixture, at a temperature above the melting point of the ingredients for a time sufficient for the reaction product to attain a constant epoxide oxygen content, and recovering said epoxide resin which is hardenable with epoxide resin hardeners.

2. The soft epoxide resin of claim 1 obtained by the process wherein said organic acid derivative is present in a ratio to provide from 3 to 8 carboxyl groups for each 30 epoxide groups in the mixture.

TABLE I

| Example | Acid in gms./150 gm. TGI | Molar ratio | Reaction conditions | Percent epoxide oxygen | Epoxide equivalent | Solubility in acetone (20° C.), percent |
|---|---|---|---|---|---|---|
| 1 | 22.2 g. propionic acid | 10:6 | 3 hours, 120–130° C. | 10.6 | 150 | >40 |
| 2 | 37 g. propionic acid | 10:10 | do | 8.7 | 184 | >55 |
| 3 | 60 g. lauric acid | 10:6 | do | 8.9 | 180 | >40 |
| 4 | 28.4 g. stearic acid | 10:2 | 3 hours, 140–145° C. | 12.0 | 133 | >40 |
| 5 | 21.9 g. adipic acid | 10:6 | do | 9.9 | 162 | >35 |
| 6 | 17 g. tetrahydrophthalic acid | 10:4 | 3 hours, 120–130° C. | 11.8 | 135 | >40 |
| 7 | 36.6 g. benzoic acid | 10:6 | 3 hours, 130–135° C. | 9.8 | 163 | >40 |
| 8 | 37.8 g. cyclohexane carboxylic acid | 10:6 | 3 hours, 120–130° C. | 8.7 | 184 | >40 |

3. The soft epoxide resin of claim 1 obtained by the process wherein said reaction is conducted at a temperature between 110° C. and 150° C.

4. The soft epoxide resin of claim 1 obtained by the process wherein said organic acid derivative is an alkanoic acid having from 2 to 8 carbon atoms.

5. The soft epoxide resin of claim 1 obtained by the process wherein said organic acid derivative is selected from the group consisting of an alkanedioic acid having from 2 to 8 carbon atoms and tetrahydrophthalic acid.

6. A stable epoxide resin composition which comprises the product of claim 1, in combination with an organic dicarboxylic acid anhydride epoxide resin hardener, said composition being stable at temperatures up to 60° C. and hardenable at temperatures from 60° C. to 200° C.

7. A modified triglycidylisocyanurate obtained by reacting at an elevated temperature (1) triglycidylisocyanurate with (2) a compound that contains at least one carboxyl group wherein said carboxyl group is derived from a dicarboxylic acid, there being used in said reaction for 1 mol of triglycidyl isocyanurate 0.1 to 1.0 equivalent of carboxyl group.

8. A modified triglycidylisocyanurate according to claim 7, which is derived from a dicarboxylic acid selected from the group consisting of aliphatic and cycloaliphatic dicarboxylic acid as compound (2).

9. A modified triglycidyl isocyanurate obtained by reacting at elevated temperature (1) triglycidyl isocyanurate with (2) a compound that contains at least one functional group selected from the group consisting of carboxyl group and monocarboxylic acid anhydride group wherein said carboxylic group is derived from a dicarboxylic acid and mixtures of such compounds with monocarboxylic acids, there being used in said reaction for 1 mol of triglycidyl isocyanurate 0.3 to 0.8 equivalent of functional group when said group is carboxyl group and 0.15 to 0.4 equivalent of functional group, when said group is monocarboxylic acid anhydride group.

10. A modified triglycidylisocyanurate obtained by reacting at an elevated temperature (1) triglycidylisocyanurate with (2) a monocarboxylic acid anhydride selected from the group consisting of aliphatic and cycloaliphatic monocarboxylic acid anhydride, there being used in said reaction for 1 mol of triglycidylisocyanurate 0.05 to 0.5 equivalent of functional group, when said group is monocarboxylic acid anhydride group.

References Cited

UNITED STATES PATENTS

| | | | |
|---|---|---|---|
| 3,337,509 | 8/1967 | Budnowski | 260—77.5 |
| 3,219,603 | 11/1965 | Scheibli | 260—18 |
| 2,970,983 | 2/1961 | Newey | 260—18 X |
| 2,947,726 | 8/1960 | Belanger | 260—18 X |
| 2,934,506 | 4/1960 | Hicks et al. | 260—18 |
| 2,759,901 | 8/1956 | Greenlee | 260—18 |
| 3,041,302 | 6/1962 | Leutner | 260—47 X |

OTHER REFERENCES

Epoxy Resin; Lee and Neville; McGraw-Hill; N.Y., 1957; pp. 57–58.

WILLIAM H. SHORT, Primary Examiner

T. E. PERTILLA, Assistant Examiner

U.S. Cl. X.R.

117—161 ZB; 161—184; 260—30.4 Ep, 30.8 DS, 31.2 N, 32.8 Ep, 33.4 Ep, 33.6 Ep, 33.8 Ep, 37 Ep, 77.5 NC, 78.4 Ep, 834